United States Patent [19]

Hanselman

[11] Patent Number: 5,396,343
[45] Date of Patent: Mar. 7, 1995

[54] IMAGE COMPRESSSION SYSTEMS WITH OPTIMIZED DATA ACCESS

[75] Inventor: Eric G. Hanselman, Framingham, Mass.

[73] Assignee: NEC Electronics, Inc., Mountain View, Calif.

[21] Appl. No.: 669,542

[22] Filed: Mar. 14, 1991

[51] Int. Cl.⁶ .............................................. H04N 1/41
[52] U.S. Cl. .................................. 358/426; 358/404; 395/164
[58] Field of Search ........................ 358/444, 404, 426; 395/162, 164, 165, 166

[56] References Cited

U.S. PATENT DOCUMENTS

| | | | |
|---|---|---|---|
| 4,772,956 | 9/1988 | Roche et al. | 358/133 |
| 4,783,698 | 11/1988 | Harney | 358/133 |
| 4,916,525 | 4/1990 | Drummond | 358/141 |
| 5,109,226 | 4/1992 | MacLean, Jr. | 364/260.6 |

OTHER PUBLICATIONS

High-Speed CMOS Data Book, Integrated Device Technology Inc. 1988 pp. 14-139 to 14-144.
Peter M. Fuchs, *Compressing data conserves memory in bit-mapped displays*, EDN Oct. 30, 1986, vol. 31, No. 22.
Govind Kamath, *PC Facsimile Transfer Steps Up*, Electronic Design, Mar. 9, 1989, pp. 59 to 66.
μPD72185 Advanced Compression/Expansion Engine User's Manual, (rev. B), NEC Corporation, Dec. 6, 1989, IEM-5067B.
*Microcomputer Products Data Book, Microprecessors, Peripherals, and DSP Products*, 1987, vol. 2, NEC Electronics Inc., Aug. 1986, NECEL-000658, pp. 3-193 to 3-227.
μPD72185 Advanced Compression/Expansion Engine, NEC Electronics Inc., Jan. 1989, pp. 1 to 24.
*Memory Products Data Book*, NEC Electronics Inc., 1989, NECEL-000154, pp. 5-53 to 5-66.
*Personal Computer Products*, Am7971A, Advanced Micro Devices, 1989, pp. 5-3 to 5-56.
Laurent Meilleur, *Dual-Port Memory Architecture Enhances Performance of VMEbus*, Computer Technology Review, Summer 1988, pp. 28 to 31.
David Silver & James Williamson, *Date-compression chip eases document-processing design*, System Design-/Integrated Circuits, Nov. 1987.
AM95C71, *Video Compression/Expansion Processor (VCEP)*, Advanced Micro Devices, Sep. 1988, pp. 2 to 28.
AM7971, *Compression Expansion Processor (CEP with image bit-boundary processing)*, Advanced Micro Devices, Jan. 1987, pp. 1 to 56.
Am7971A/Am95C71, VCEP, Advanced Micro Devices, Sep. 1988, pp. 1 to 13.

Primary Examiner—Edward L. Coles, Sr.
Assistant Examiner—Thomas L. Stoll
Attorney, Agent, or Firm—Skjerven, Morrill, MacPherson, Franklin & Friel

[57] ABSTRACT

An image compression system has an image memory accessible from the image bus. Compressed data are stored in a dual-ported memory accessible from both the image bus and the host bus. The compressor/expander accesses the image memory while the host accesses the dual-ported memory. Dual-ported memory allocation schemes and a computer program controlling the image compression system are also provided.

1 Claim, 11 Drawing Sheets

IMAGE COMPRESSSION SYSTEMS WITH OPTIMIZED DATA ACCESS

BACKGROUND OF THE INVENTION

1. Field of the Invention

This invention relates to data processing systems, and more particularly to image compression systems.

2. Description of Related Art

Figure 1:
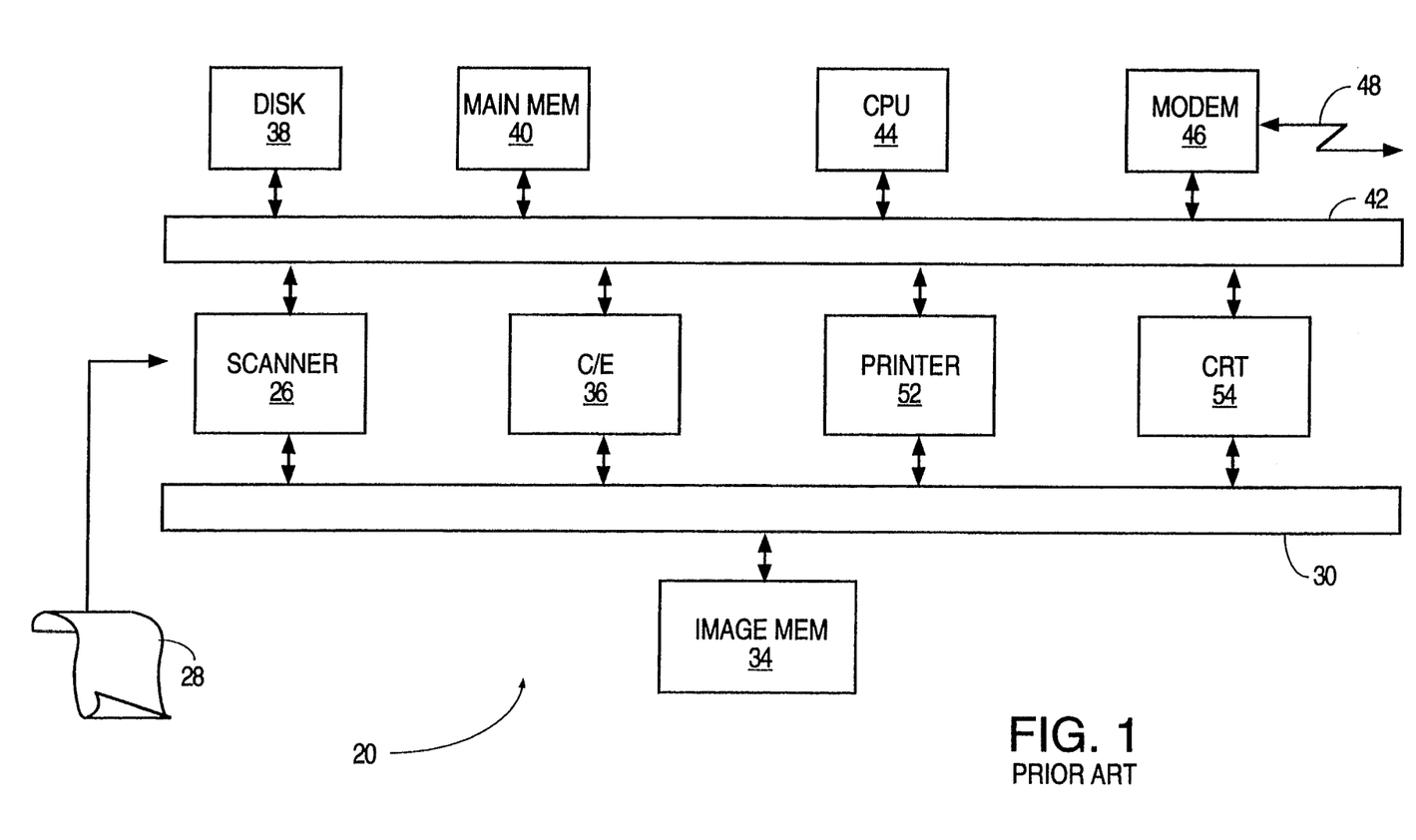
FIG. 1 is a block diagram of a prior art image compression system.

Computer based image compression systems are used for many purposes, including facsimile transmission. FIG. 1 shows a block diagram of an image compression system 20. Scanner 26 scans paper sheet 28 and digitizes the image on the sheet 28. The image data from scanner 26 are transferred through image side system bus 30 to memory 34 ("image" memory).

The image data typically occupy much memory space and take a long time to transmit. They are therefore compressed for long-term storage and transmission. The compression involves coding the image data according to a compression algorithm. Compression-/expansion processor ("compressor/expander") 36 reads the image data from image memory 34 through image side system bus 30, compresses the data and writes the compressed data to disk 38 or main memory 40 through host side system bus 42. The central processing unit ("CPU") 44 reads the compressed data from disk 38 or main memory 40 and writes the compressed data through host side system bus 42 to modem 46. Modem 46 transmits the compressed data through communication link 48 (for example, a telephone line). The compressed data are received by a FAX machine or another image compression system on the receiving end of the communication link.

When a FAX machine or another image compression system sends compressed data to image compression system 20, image compression system 20 receives the compressed data through communication link 48 at modem 46. Under the control of CPU 44, the compressed data are transferred through host side system bus 42 to disk 38 or main memory 40. Compressor/expander 36 reads the compressed data from disk 38 or main memory 40 through host side system bus 42, expands the data and writes the expanded (image) data to image memory 34 through image side system bus 30. From image memory 34, the image data are transferred to printer 52 for printing or to video terminal ("CRT") 54 for display. See Peter M. Fuchs, *Compressing data conserves memory in bit-mapped displays*, EDN. Vol. 31, No. 22.

Figure 2:
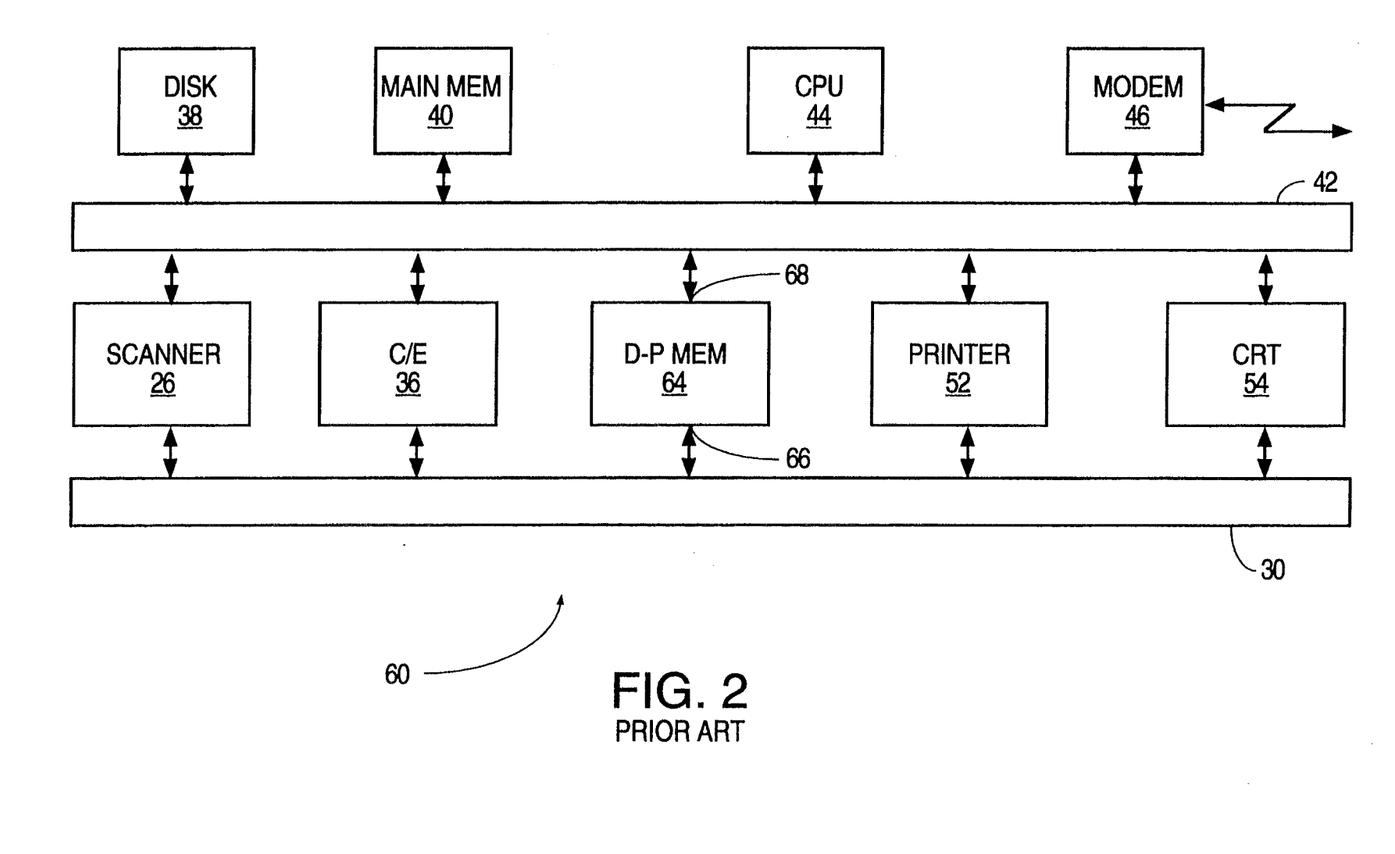
FIG. 2 is a block diagram of another prior art image compression system.

FIG. 2 shows a block diagram of another image compression system 60. Dual-ported memory 64 replaces image memory 34 of FIG. 1. Dual-ported memory 64 is used to store both image data and compressed data. Dual-ported memory 64 has image side port 66 accessible from image side system bus 30 and host side port 68 accessible from host side system bus 42. Image compression system 60 offers greater flexibility in accessing data for it allows accessing both image and compressed data from both image side system bus 30 and host side system bus 42. See Govind Kamath, *PC Facsimile Transfer Steps Up*, Electronic Design, Mar. 9, 1989, pages 59–66.

SUMMARY OF THE INVENTION

This invention provides an image compression system with an improved data access scheme for high data processing speed.

In the invention, two memories are connected to the image bus of a processor. One of the memories is a dual-ported memory. In one embodiment, the dual-ported memory holds compressed data while the other memory, which may be, for example, an image memory, holds uncompressed data. While one port of the dual-ported memory is connected to the image bus, another port is connected to a host such as CPU, disk, or a communication link. Access to the compressed data in the dual-ported memory through the port connected to the host and access to the uncompressed data in the image memory proceed simultaneously.

DESCRIPTION OF THE PREFERRED EMBODIMENT

Figure 3:
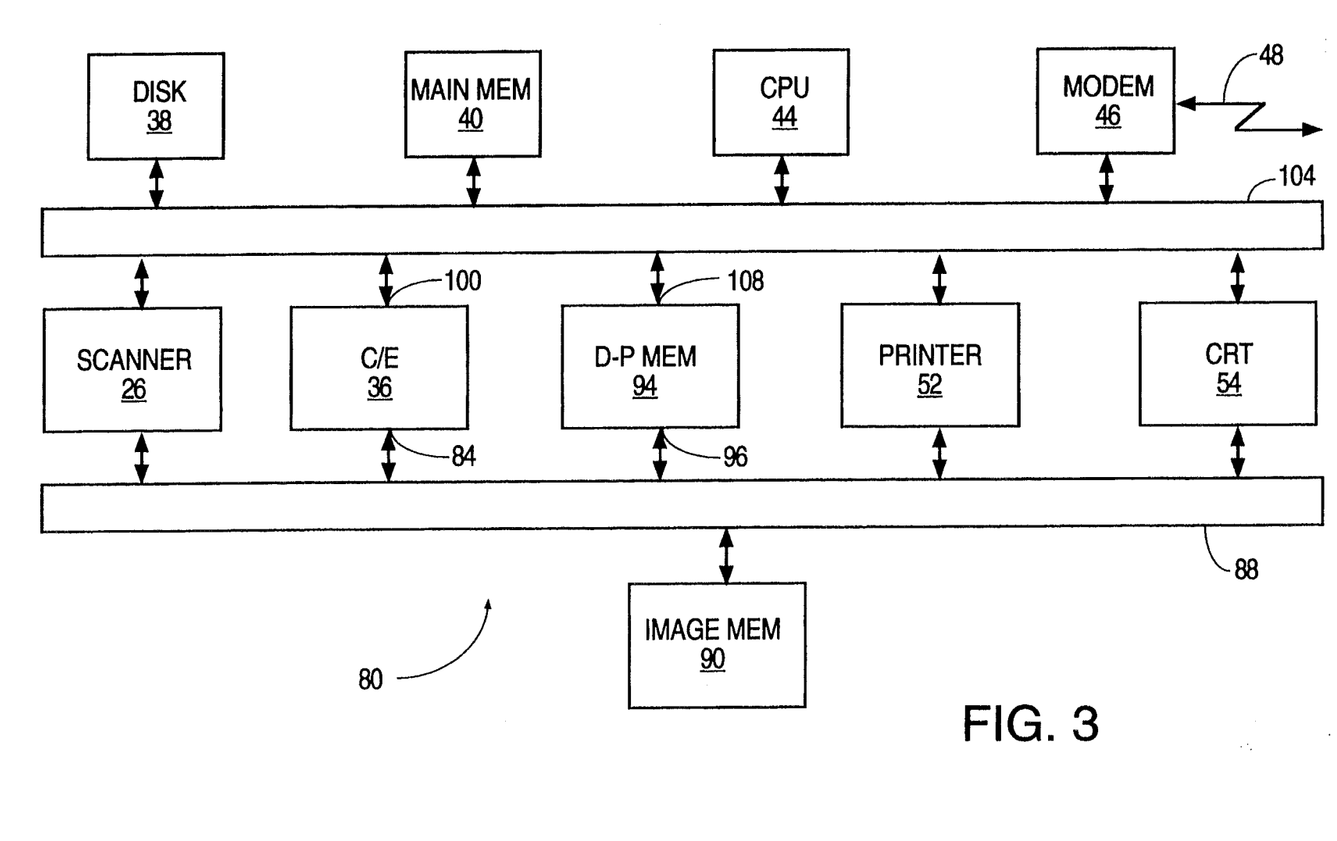
FIG. 3 is a block diagram of an image compression system according to the present invention.

In the image compression system 80 of FIG. 3, compressor/expander 36 has image bus 84 formed by a group of its pins. Image side system bus 88 provides an interface between image bus 84, memory 90 ("image" memory), and dual-ported memory 94. Image memory 90 holds uncompressed (or "image") data, or data in an uncompressed format. Image memory 90 is large; for example, 16M bytes generally is satisfactory. Dual-ported memory 94 holds compressed data, or data in a compressed format. It is several times smaller than image memory 90; for example, 1M bytes generally is satisfactory. Dual-ported memory 94 is accessible from image side system bus 88 through port 96 ("image side port").

Compressor/expander 36 also has host bus 100 formed by a group of its pins. Host side system bus 104 provides an interface between host bus 100 and central processing unit ("CPU") 44. Compressor/expander 36 receives commands from CPU 44 and provides status information to CPU 44 through host bus 100.

Dual-ported memory 94 has port 108 ("host side port") accessible from host side system bus 104.

Host side system bus 104 provides an interface to modem 46 connected to communication link 48, printer 52, video terminal ("CRT") 54, main memory 40, disk 38, and scanner 26. Image side system bus 88 provides an interface to printer 52, CRT 54, and scanner 26.

Figure 4:
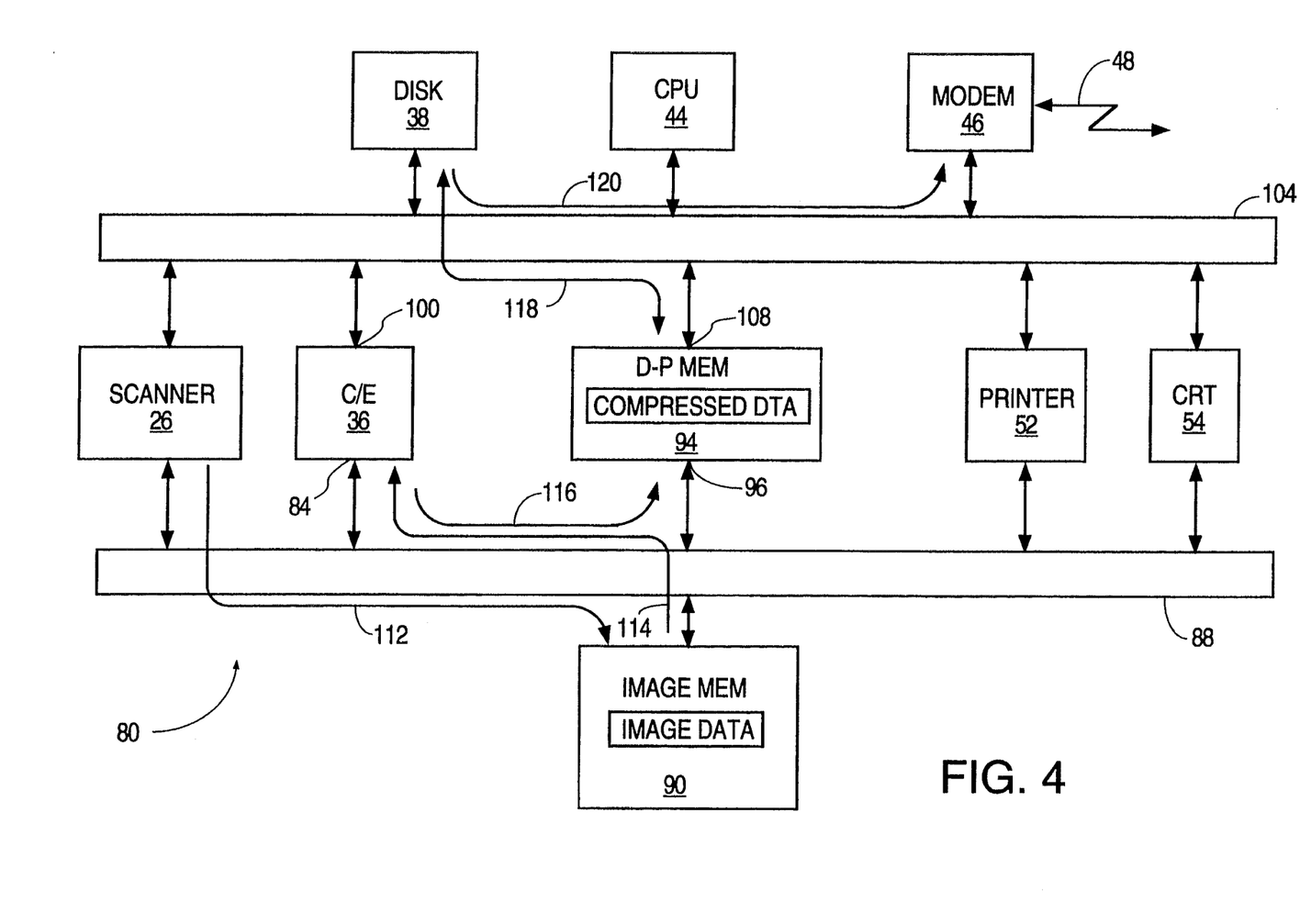
FIGS. 4 and 5 show block diagrams and data flow diagrams for the image compression system of FIG. 3.

FIG. 4 shows the data flow in a typical data compression operation in image compression system 80. Scanner 26 scans a sheet of paper and digitizes the image on the sheet. The image data from scanner 26 are written through image side system bus 88 to image memory 90 as is shown by arrow 112. When compressor/expander 36 receives, at its host bus 100, an appropriate command from CPU 44, compressor/expander 36 reads the image data from image memory 90 (arrow 114), compresses the data and writes the compressed data through its image port 84 and image side system bus 88 to image side port 96 of dual-ported memory 94 (arrow 116). As compressor/expander 36 compresses and writes to dual-ported memory 94 one portion of data after another, the compressed data are read from host side port 108 and written to disk 38 through host side system bus 104 (arrow 118), typically by a DMA (Direct Memory Access) transfer. At a convenient time, the compressed data are read from disk 38 to modem 46 (arrow 120).

The use of separate memories 90 and 94 for image data and compressed data allows accessing image data and compressed data simultaneously. Reading image data from image memory 90 (arrow 114) does not require a dual-ported memory access and so proceeds simultaneously with the operation of reading compressed data from host side port 108 of dual-ported memory 94 (arrow 118). The result is a faster operation and higher throughput of image compression system 80.

During a typical expansion operation, the data flow from modem 46 to image memory 90 is reversed. The compressed data are received by modem 46 through communication link 48 and are written to disk 38 (the reverse direction of arrow 120). The compressed data from disk 38 are written to host side port 108 (reverse direction of arrow 118), read through image side port 96 by compressor/expander 36 (reverse of arrow 116), expanded, and written to image memory 90 (reverse of arrow 114). The image data from image memory 90 is printed on printer 52 or displayed on CRT 54. The operations of writing to host side port 108 (reverse of arrow 118) and writing to image memory 90 (reverse of arrow 114) proceed simultaneously since the latter operation does not require an access to dual-ported memory 94. As a result, image compression system 80 is fast and has a high throughput.

There exist various algorithms for compressing image data. Compressor/expander 36 uses the algorithm specified by a command from CPU 44.

Different algorithms are sometimes used to compress the same data. For example, a CCITT recommendation T.4 (Group 3) algorithm is often used to compress the data for transmission. For a description of the CCITT algorithms, see $\mu PD72185$ *Advanced Compression/Expansion Engine User's Manual* (rev. B) (NEC Corporation, Dec. 6, 1989, IEM-5067B) hereby incorporated by reference herein. However, the CCITT recommendation T.6 (Group 4) algorithm is often preferred for compressing data for storage, because this algorithm often allows a greater compression. It is then desirable to receive data compressed according to one compression algorithm and to recompress the data according to another compression algorithm. Image compression system 80 receives the data compressed according to the first algorithm through communication link 48 and transfers the data through modem 46, disk 38 and dual-ported memory 94 to compressor/expander 36 as in the above-described expansion operation (reverse of arrows 120, 118, and 116). Compressor/expander 36 expands the data and stores the expanded data in image memory 90 (reverse of arrow 114). Image compression system 80 then recompresses the expanded data according to the second algorithm and stores the recompressed data on disk 38 as described above. That is, compressor/expander 36 reads the expanded (image) data from image memory 90 (arrow 114), compresses them according to the second algorithm, writes them to image side port 96 of the dual-ported memory 94 (arrow 116), from where the data are read through host side port 108 and written to disk 38 (arrow 118).

A similar method is used to recompress the data on disc 38 for transmission through modem 46.

In some embodiments, compressor/expander 36 expands one portion of the data and compresses another portion simultaneously. High throughput is achieved.

Figure 5:
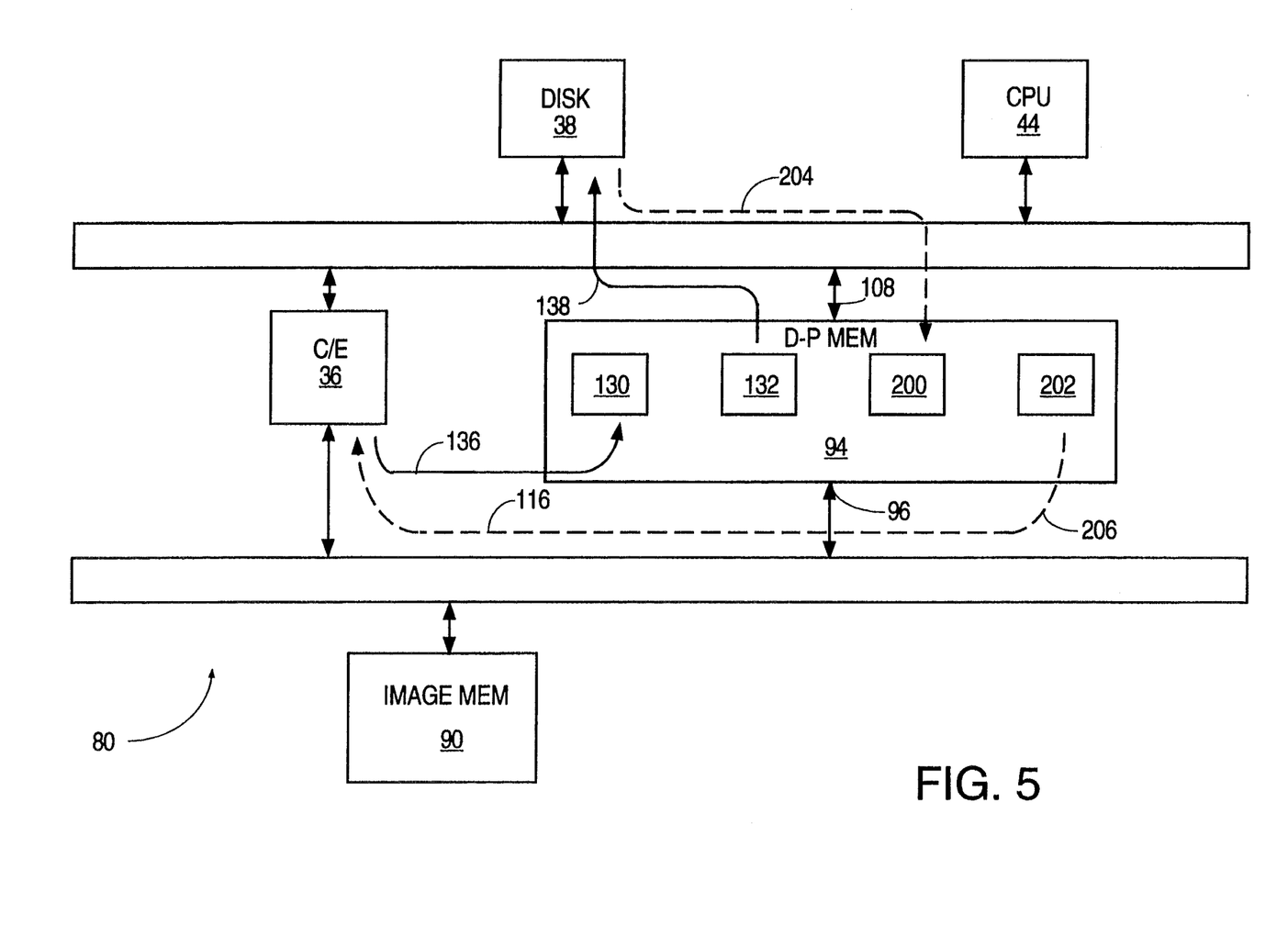

FIG. 5 shows a dual-ported memory 94 allocation scheme during the compression and expansion operations. Two memory buffers 130 and 132 are allocated in dual-ported memory 94. Each memory buffer is an area of dual-ported memory 94. During the compression operation, compressor/expander 36 fills buffers 130 and 132 through image side port 96, while a host (that is, CPU 44 or a DMA controller (not shown)) empties buffers 130 and 132 through host side port 108 and writes the compressed data to disk 38. While compressor/expander 36 fills buffer 130 (arrow 136), the host empties buffer 132 (arrow 138). While compressor/expander 36 fills buffer 132, the host empties buffer 130. Since compressor/expander 36 and the host always access different memory buffers, they work almost independently of each other. The synchronization between them is minimal and requires but a small overhead. Namely, the host must not empty the buffer before compressor/expander 36 fills it. Also, compressor/expander 36 must not fill the buffer with new data before the host empties it. Such synchronization is simple.

Figure 6:
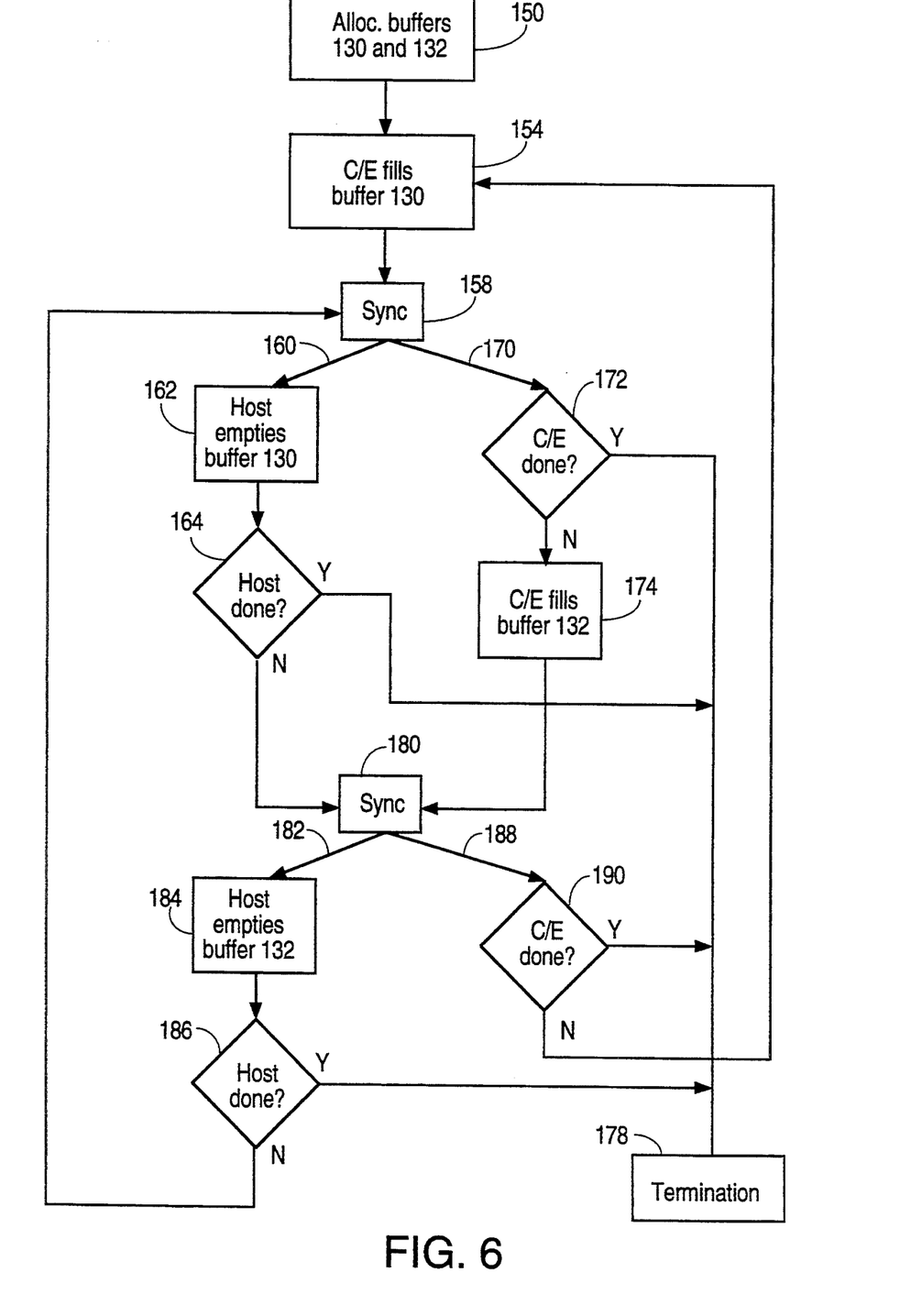
FIG. 6 is a flowchart of a computer program executed by the image compression system of FIG. 3.

FIG. 6 shows a flowchart of a computer program executed by CPU 44 to perform the compression operation. At step 150, buffers 130 and 132 are allocated in dual-ported memory 94. At step 154, compressor/expander 36 fills buffer 130. At step 158, a synchronization operation is performed to prepare the host to empty buffer 130. From step 158, control branches in two directions: along arrow 160 to the branch with steps 162 and 164 and along arrow 170 to the branch with steps 172 and 174. The two branches are executed in parallel. On the arrow 160 branch, the host empties buffer 130 at step 162. At step 164, a check is made whether no more data need to be transferred from dual-ported memory 94 to disk 38. If the answer is yes, control from step 164 passes to termination step 178. If the answer is no, control passes to synchronization step 180 in which the host prepares to empty buffer 132.

On the arrow 170 side, at step 172, a check is made whether compressor/expander 36 has completed its work and will write no more data to dual-ported memory 94. If the answer is yes, control from step 172 passes to termination step 178. Otherwise control from step 172 passes to step 174 at which compressor/expander 36 fills buffer 132. From step 174, control passes to synchronization step 180 at which compressor/expander 36 prepares to fill buffer 130. From synchronization step 180, control branches along arrow 182 to steps 184 and 186 and along arrow 188 to steps 190 and 154. On the arrow 182 side, at step 184, the host empties buffer 132. At step 186, a check is made whether the host work is completed. If the answer is yes, control passes to termination step 178. Otherwise, control passes to synchronization step 158 at which the host prepares to empty buffer 130. On the arrow 188 side, at step 190, a check is made whether compressor/expander 36 has completed its work. If the answer is yes, control passes to termination step 178. If the answer is no, control passes to step 154 at which compressor/expander 36 fills buffer 130. From step 154, control passes to synchronization step 158 at which compressor/expander 36 prepares to fill buffer 132.

In a multitasking environment, if, in steps 158 and 180, the host empties one of buffers 130 and 132 before compressor/expander 36 fills the other buffer, the host is available for use by other programs while the host waits for compressor/expander 36. Likewise, if compressor/expander 36 fills one of the buffers before the host empties the other buffer, compressor/expander 36 is available for use by other program while it waits for the host.

Eventually compressor/expander 36 finishes all its work, and control from step 172 or step 190 passes to termination step 178. Eventually the host empties the last buffer of data, and control from step 164 or step 186 also passes to termination step 178. At step 178, the program terminates.

The expansion operation is performed similarly. While the host fills buffer 130 by compressed data from disk 38, compressor/expander 36 empties buffer 132. While the host fills buffer 132, compressor/expander 36 empties buffer 130.

When the compression and expansion operations overlap, a separate pair of buffers is used for the expansion operation. Referring to FIG. 5, buffers 130 and 132 are used for compression and buffers 200 and 202 are used for expansion. Suppose for example that data on disk 38 compressed according to one compression algorithm must be recompressed according to a second compression algorithm. The compressed data are expanded and then recompressed according to methods described above. The data are expanded using buffers 200 and 202. Namely, as the host fills buffer 200 with the data from disk 38 (broken arrow 204), compressor/expander 36 empties buffer 202 (broken arrow 206); and vice versa. The expanded data are recompressed using buffers 130 and 132. Namely, as compressor/expander 36 fills buffer 130 with recompressed data (arrow 136), the host empties buffer 132 (arrow 138); and vice versa. In one variation, compressor/expander 36 compresses the data to be written to buffers 130 and 132 and expands the new data from buffers 200 and 202 simultaneously. A high degree of overlap of data compressing and data expanding by compressor/expander 36 and of accessing disk 38, dual-ported memory 94, and image memory 90 results in a high throughput of image compression system 80.

In some embodiments, dual-ported memory 94 of image compression system 80 holds image data. In a compression operation, image data from scanner 26 are written through host side system bus 104 and host side port 108 to dual-ported memory 94. Compressor/expander 36 reads the image data from dual-ported memory 94 through image side port 96 and image side system bus 88, compresses the data and writes the compressed data to host side system bus 104. The compressed data are then written to disk 38, main memory 40 or modem 46.

Figure 7:
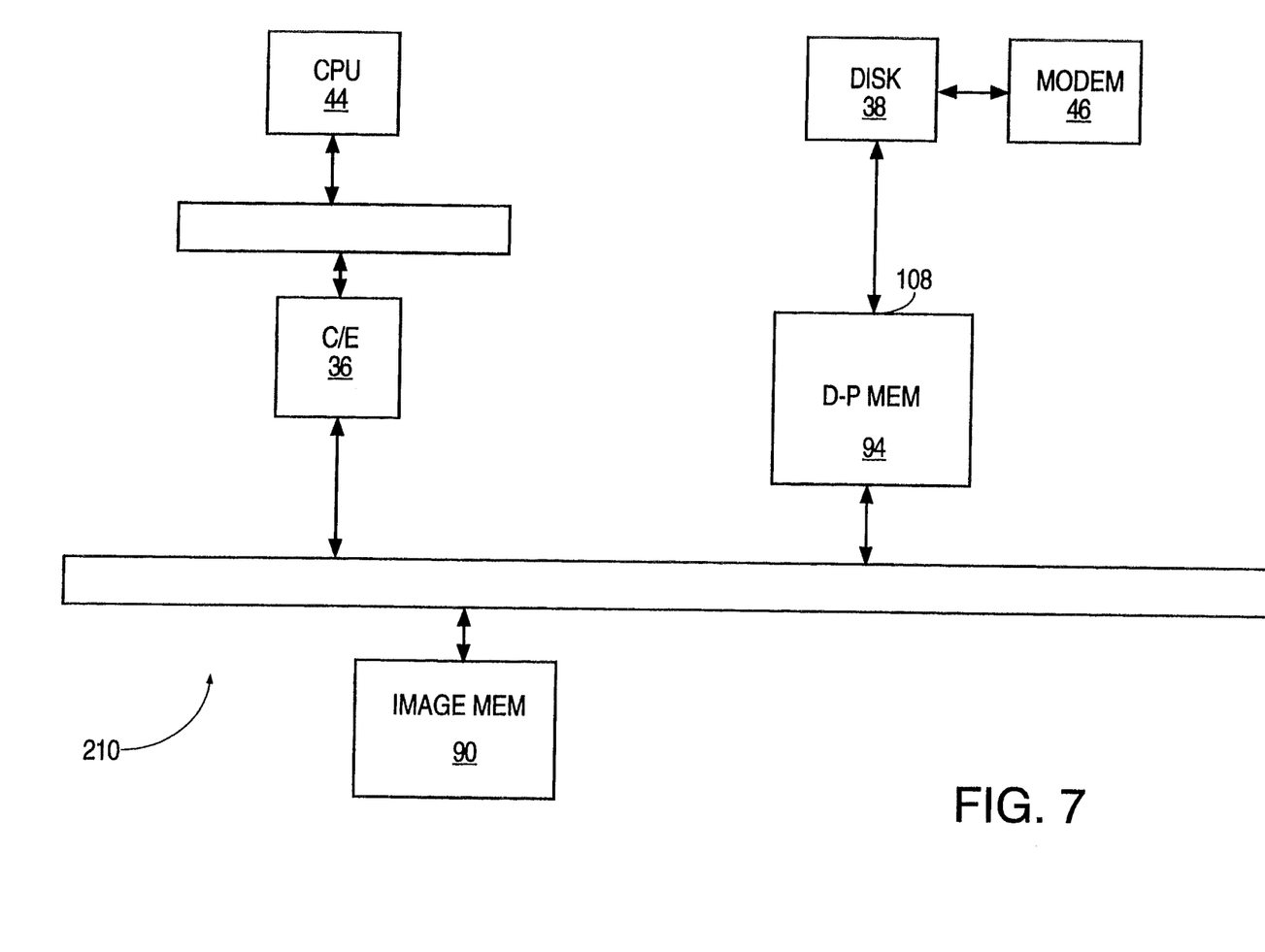
FIG. 7 is a block diagram of another image compression system according to the present invention.

FIG. 7 shows another image compression system 210 in which host side port 108 of dual-ported memory 94 is connected directly to disk 38 which in turn is connected to modem 46.

The expansion operation proceeds similarly in the reverse direction. Compressor/expander 36 reads the compressed data from host side system bus 104, expands the data, and writes the expanded data to dual-ported memory 94 through image side system bus 88. From dual-ported memory 94, the expanded data are written to host side system bus 104, and then, for example, to printer 52 or CRT 54.

Figure 8A:
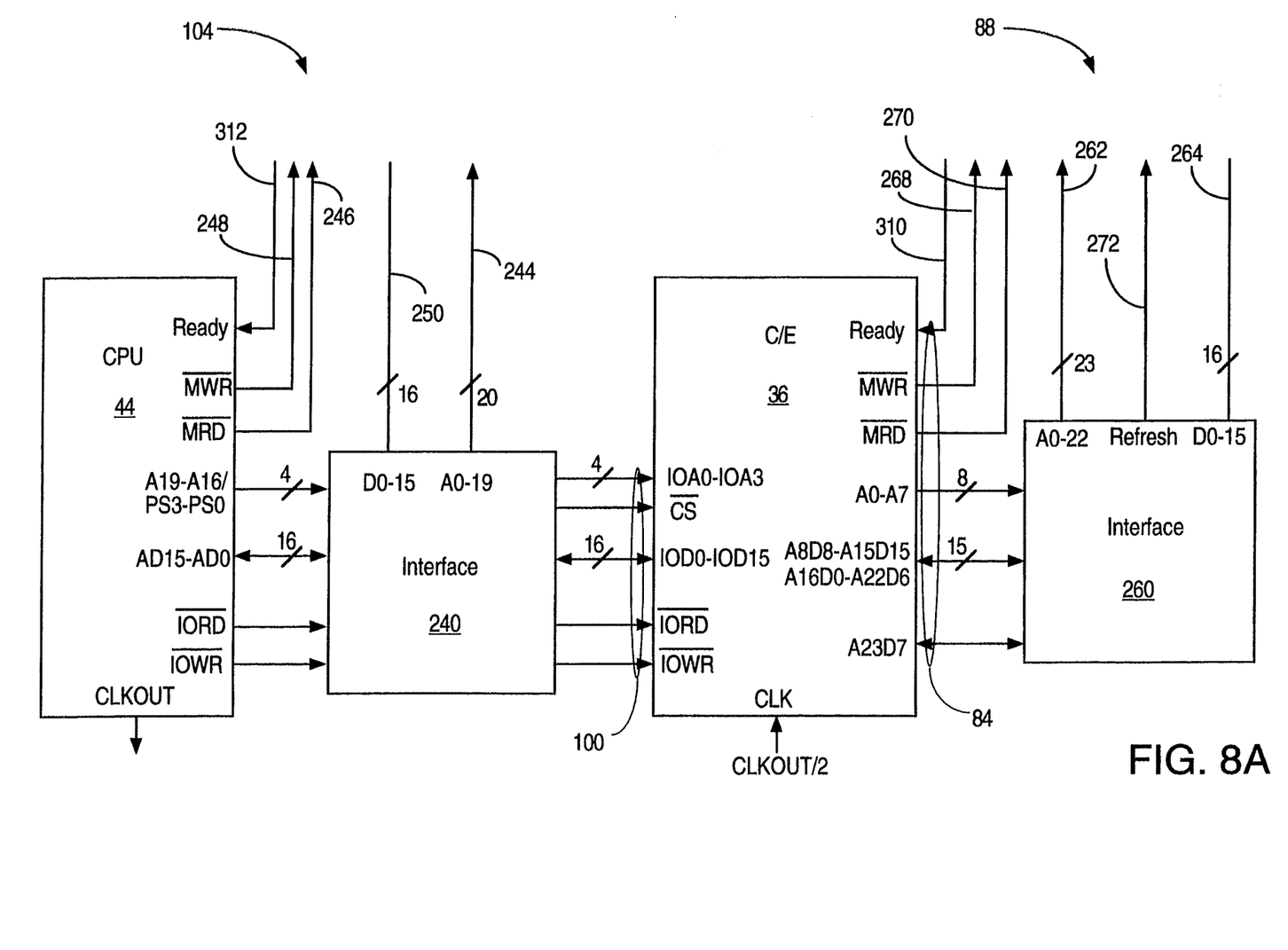
FIGS. 8A–8C are a circuit level diagram of a part of an image compression system of the present invention.
Figure 8B:
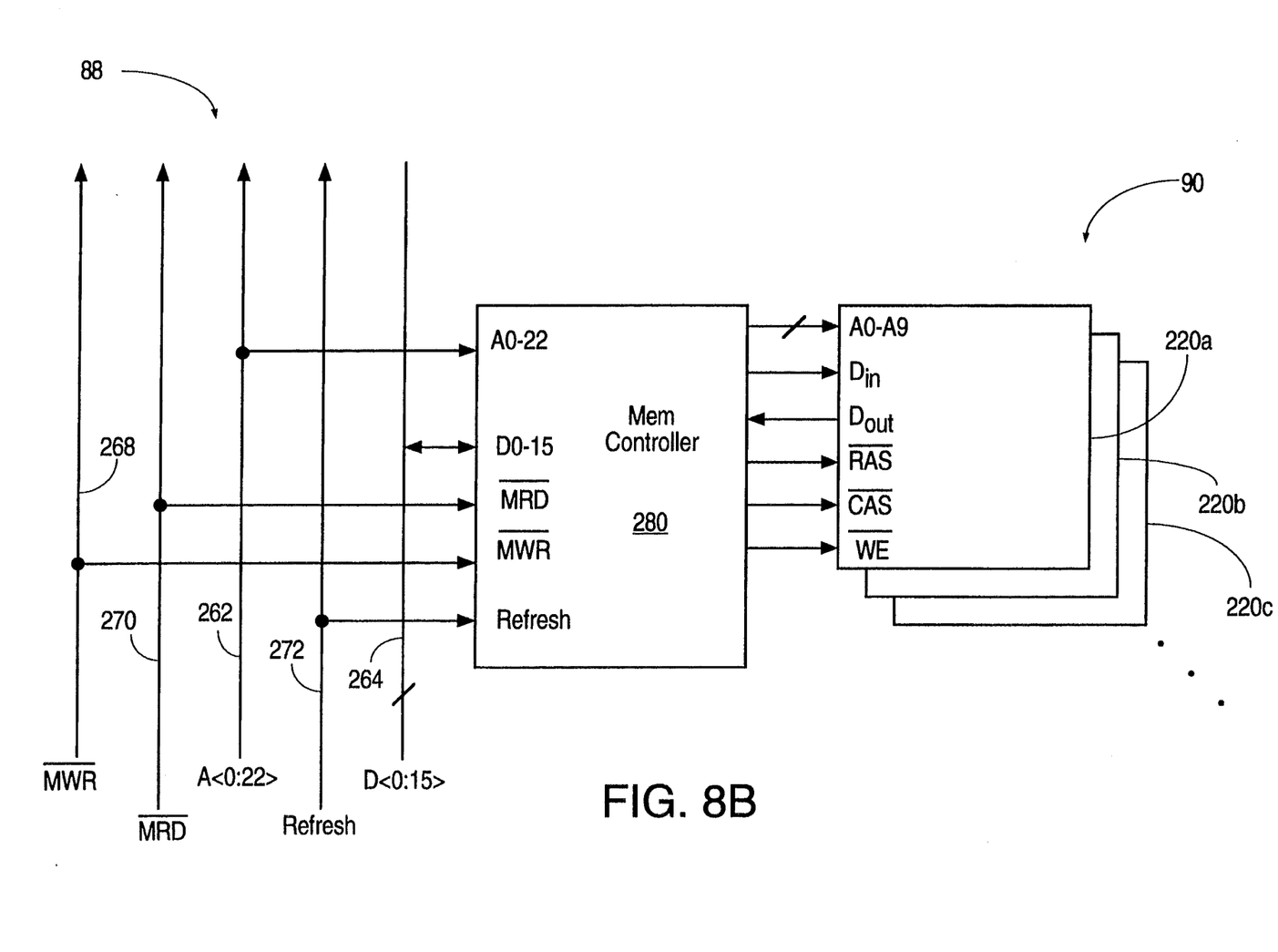
Figure 8C:
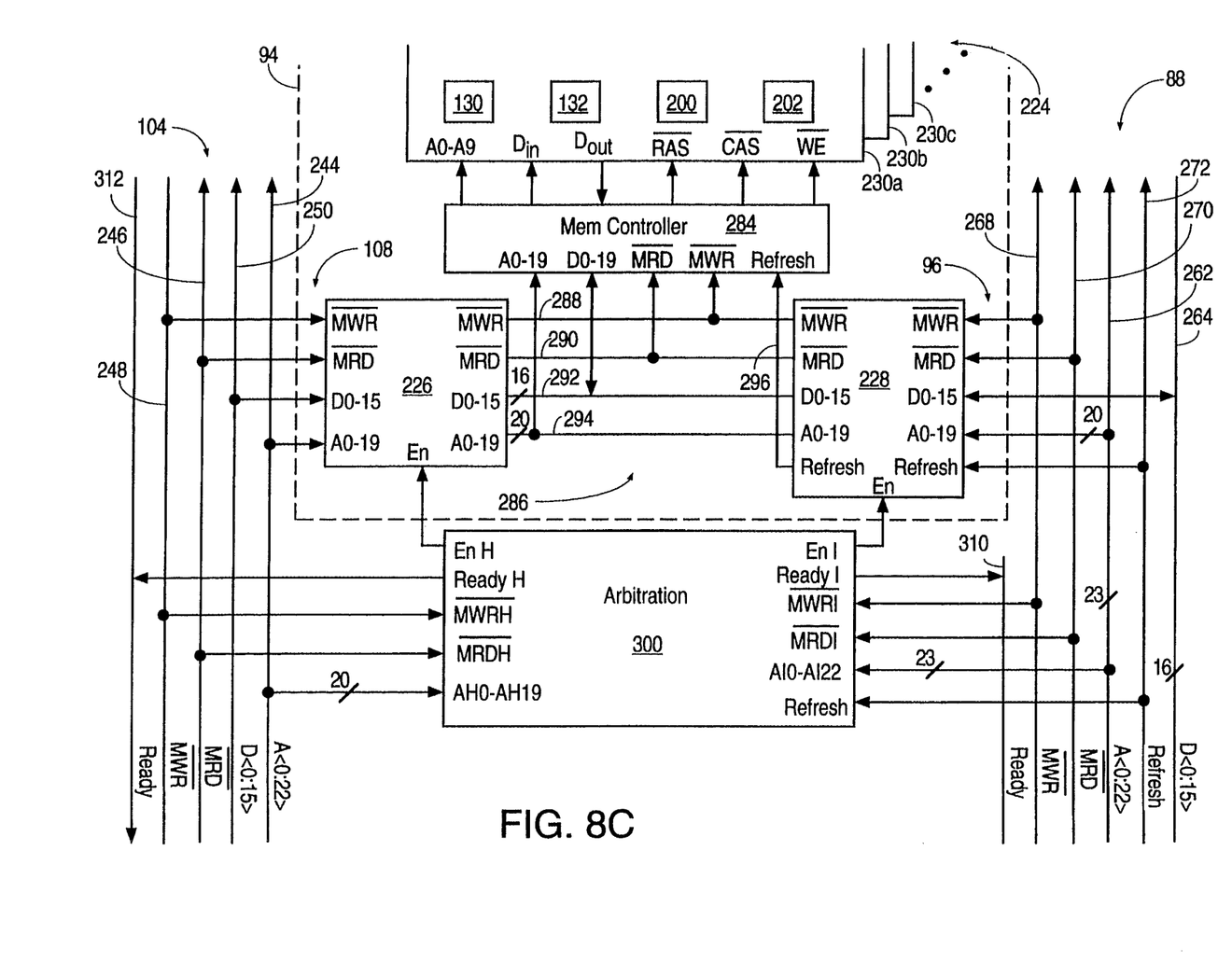

FIGS. 8 shows a circuit level diagram of an embodiment of image compression system 80. CPU 44 (FIG. 8A) is a V50 TM microprocessor also known as μPD70216 available from NEC Electronics Inc. of Mountain View, California. The V50 microprocessor is described in 1987 *Microcomputer Data Book. Microprocessors, Peripherals, and DSP Products*, vol. 2 (NEC Electronics Inc. August 1986, NECEL-000658, Stock No. 500105) hereby incorporated by reference herein. Compressor/expander 36 is Advanced Compression-/Expansion Engine μPD72185 available from NEC Electronics Inc. and described in the data sheet published by NEC Electronics Inc. in January 1989 (document UID-50000). The data sheet is hereby incorporated by reference herein. See also μPD72185 *Advanced Compression/Expansion Engine User's Manual* (rev. B) (NEC Corporation, Dec. 6, 1989, IEM-5067B) incorporated by reference herein. Image memory 90 (FIG. 8B) comprising, for example, chips 220a, 220b and 220c is implemented by dynamic random access memory ("DRAM") chips such as type μPD421000 available from NEC Electronics Inc. of Mountain View, California and described in *Memory Products Data Book* 1989 (NEC Electronics Inc. 1988, NECEL-000154, Stock No. 600100, Document No. UIS-UP60000) hereby incorporated by reference herein. DRAMs 220 are combined in a conventional manner to form image memory 90. Dual-ported memory 94 (FIG. 8C) is implemented by memory 224 and bidirectional buffers 226 and 228 controlling access to memory 224 through, respectively, host side port 108 and image side port 96. Buffers 226 and 228 should not be confused with memory buffers 130, 132, 200 and 202 described above in connection with FIG. 5 and comprising memory locations inside memory 224. Memory 224 is built from DRAMs 230a, 230b, 230c, and other like DRAMs (not shown) of type μPD421000 described above in connection with image memory 90.

CPU 44 (FIG. 8A) has a 20-bit address bus comprising four outputs of address/status bus A19-A16/PS3-PS0 and 16 pins of address/data bus AD15-AD0. The four address outputs A19-A16/PS3-PS0 are multiplexed with the CPU status bus. The 16 address pins AD15-AD0 are multiplexed with the CPU data bus. CPU 44 accesses compressor/expander 36 using I/O cycles. In I/O cycles, only address/data bus AD15-AD0 carries address signals. CPU 44 issues commands to compressor/expander 36 by writing suitable data to internal registers of compressor/expander 36. CPU 44 reads status information from compressor/expander 36 by reading internal registers of compressor/expander 36. When CPU 44 writes to a compressor/expander register, CPU 44 identifies the register by address signals on its address/data bus AD15-AD0. Interface circuit 240 connects address pins AD3-AD0 to respective compressor/expander address inputs IOA0-IOA3 which identify the register to compressor/expander 36. Interface circuit 240 determines from the address signals on CPU 44 address pins AD15-AD4 that CPU 44 is accessing compressor/expander 36, and asserts input $\overline{CS}$ of compressor/expander 36. CPU 44 then outputs the data to be written to the register on the CPU address-/data bus AD15-AD0. The data are passed by interface circuit 240 to the compressor/expander data pins IOD0-

IOD15. CPU 44 asserts its output $\overline{\text{IOWR}}$ to indicate the writing operation. In response, interface circuit 240 asserts the $\overline{\text{IOWR}}$ input of compressor/expander 36 to cause compressor/expander 36 to write the data on data pins IOD0-IOD15 to the register identified by inputs IOA0-IOA3. See 1987 *Microcomputer Data Book* and μ*PD72185 Advance Compression/Expansion Engine User's Manual*, supra.

When CPU 44 reads status information from a compressor/expander register, CPU 44 identifies the register by address signals on its address/data bus AD15-AD0. Interface circuit 240 connects address pins AD3-AD0 to respective compressor/expander inputs IOA0-IOA3 which identify the register to compressor/expander 36. Interface circuit 240 determines from the address signals on CPU 44 address pins AD15-AD4 that CPU 44 is accessing compressor/expander 36, and asserts input $\overline{\text{CS}}$ of compressor/expander 36. CPU 44 asserts its $\overline{\text{IORD}}$ output to indicate the reading operation. In response, interface circuit 240 asserts the $\overline{\text{IORD}}$ input of compressor/expander 36. Compressor/expander 36 then provides the register contents on pins IOD0-IOD15. Interface circuits 240 passes the register contents from pins IOD0-IOD15 to the CPU data bus AD15-AD0.

When CPU 44 interacts with other devices connected to host side bus 104, interface circuit 240 provides address signals from the CPU address/status bus A19-A16/PS3-PS0 and address/data bus AD15-AD0 on 20-bit host side address bus 244. Interface circuit 240 also provides an interface between data signals on the CPU address/data bus AD15-AD0 and 16-bit host side data bus 250. Interface circuit 240 is implemented in any suitable manner, such as by a programmable logic device using conventional design and implementation methods, as is well known in the art. In one variation, to decode address signals from CPU 44, interface circuit 240 uses address comparators 74LS640 available from Texas Instruments of Dallas, Texas.

CPU 44 provides outputs $\overline{\text{MRD}}$ and $\overline{\text{MRW}}$ on, respectively, host side memory read line 246 and host side memory write line 248.

CPU 44 is clocked by an internal clock which CPU 44 outputs on its pin CLKOUT. This clock is divided by 2 in a conventional manner, and the divided signal is fed to the compressor/expander clock input CLK.

Image bus 88 of compressor/expander 36 includes 23 address outputs A0-A7, A8D8-A15D15, A16D0-A22D6. The 15 address outputs A8D8-A15D15, A16D0-A22D6 are multiplexed with 15 data inputs/outputs. Input/output A23D7 provides the 16th data input/output. The A23D7 data input/output is multiplexed with a refresh timing output for refreshing DRAMs. The A23D7 timing output becomes high level every 64 clocks of the compressor/expander clock CLK (every 8 μs if the compressor/expander clock CLK is at 8 MHz). The A23D7 refresh timing output signals when DRAMs 220 (FIG. 8B) and 230 (FIG. 8C) should be refreshed.

When compressor/expander 36 writes data to image memory 90 or dual-ported memory 94, compressor/expander 36 outputs the memory address on address outputs A0-A7, A8D8-A15D15, A16D0-A22D6. Interface circuit 260 places the memory address on 23-bit image side address bus 262. Compressor/expander 36 outputs the data to the data input/output pins A8D8-A15D15, A16D0-A22D6, A23D7. Interface circuit 260 places that data on the image side 16-bit data bus 264. Compressor/expander 36 also asserts its memory write output $\overline{\text{MWR}}$ to indicate the writing operation. The compressor/expander memory write output $\overline{\text{MWR}}$ is placed on image side memory write line 268.

When compressor/expander 36 reads data from image memory 90 or dual-ported memory 94, compressor/expander 36 outputs the memory address on outputs A0-A7, A8D8-A15D15, A16D0-A22D6. Interface circuit 260 places that address on image side address bus 262. Compressor/expander 36 asserts its memory read output $\overline{\text{MRD}}$ to indicate the reading operation. The compressor/expander memory read output $\overline{\text{MRD}}$ is placed on image side memory read line 270. The memory reads the address from image side address bus 262 and places the corresponding data on image side data bus 264 as explained below. Interface circuit 260 provides the data from image side data bus 264 to the compressor/expander inputs/outputs ASD8-A15D15, A16D0-A22D6, A23D7.

When DRAMs 220 and 230 should be refreshed, the compressor/expander refresh timing output A23D7 becomes high level. The compressor/expander image bus outputs including $\overline{\text{MRD}}$ become active in the same manner as in the reading operation. See μ*PD72185 Advanced Compression/Expansion Engine User's Manual*, supra. The refresh timing output signal on pin A23D7 is placed by interface circuit 260 onto image side refresh line 272. DRAMs 220 and 230 then get refreshed as described below.

FIG. 8B shows the interface to image memory 90. Image memory 90 is built from DRAMs 220 described above. Each DRAM 220 has address inputs A0-A9, a data input $D_{in}$, a data output $D_{out}$, a read address strobe input $\overline{\text{RAS}}$, a column address strobe input $\overline{\text{CAS}}$, and a write enable input $\overline{\text{WE}}$.

When compressor/expander 36 writes to image memory 90, memory controller 280 determines from image side memory write line 268 that a memory writing operation is taking place. Memory controller 280 determines from the address on image side address bus 262 that image memory 90 is being written. Memory controller 280 further determines, from the address, which DRAMs 220 are being written, at what addresses they are being written, and which data bit on image side data bus 264 must be written to which DRAM. For each DRAM 220 being written, memory controller 280 supplies the row address on the DRAM address inputs A0-A9 and asserts the DRAM row address strobe input $\overline{\text{RAS}}$. Memory controller 280 further asserts the write enable input $\overline{\text{WE}}$. Memory controller 280 further provides the column address on the address inputs A0-A9 and asserts the column address strobe input $\overline{\text{CAS}}$. Memory controller 280 supplies the appropriate 1-bit data signal from image side data bus 264 to the DRAM input $D_{in}$.

When compressor/expander 36 reads image memory 90, memory controller 280 determines from image side memory read line 270 that a memory reading operation is taking place. Memory controller 280 determines from the address on image side address bus 262 that image memory 90 is being read. Memory controller 280 further determines, from the address, which DRAMs 220 are being read, at what addresses, and which data bit from each DRAM being read is to be placed on which line of image side data bus 264. For each DRAM 220 being read, memory controller 280 supplies the row address on the DRAM address inputs A0-A9 and asserts the row address strobe input $\overline{\text{RAS}}$. Memory controller 280 further provides the column address on the address inputs A0-A9 and asserts the column address strobe input $\overline{CAS}$. The DRAM 220 then provides the corresponding data bit on its output $D_{out}$. Memory controller 280 places that bit on a corresponding line of image side data bus 264.

During a refresh operation, refresh line 272 becomes high level. Memory controller 280 determines from refresh line 272 that DRAMs 220 must be refreshed. For each DRAM 220, memory controller 220 asserts the column address strobe input $\overline{CAS}$, and then the row address strobe input $\overline{RAS}$. When the column address strobe $\overline{CAS}$ is asserted before the row address strobe $\overline{RAS}$, DRAMs 220 get refreshed by their internal circuitry. See *Memory Products Data Book* 1989, supra, for timing information on DRAMs 220.

FIG. 8C shows the interface to dual-ported memory 94. Dual-ported memory 94 includes memory 224 built from DRAMs 230 described above and memory controller 284. Internal bus 286 is formed by memory write line ($\overline{MWR}$) 288, memory read line ($\overline{MRD}$) 290, data lines (D0-D15) 292, address lines (A0-A19) 294, and refresh line 296. Internal bus 286 is connected to image side port 96 by image side buffer 228. Image side port 96 is formed by pins $\overline{MWR}$, $\overline{MRD}$, D0-D15, A0-A19, and Refresh of image side buffer 228. The pins $\overline{MWR}$, $\overline{MRD}$, D0-D15, and Refresh of image side port 96 are connected to respective lines 268, 270, 264 and 272 of image side bus 88. The 20 address pins A0-A19 of image side port 96 are connected to selected 20 of the 23 lines of image side address bus 262. The enable input En of image side buffer 228 is connected to output EnI of arbitration circuit 300 described below. When the enable input En of image side buffer 228 is high, image side buffer 228 connects the pins of image side port 96 to the respective lines of internal bus 286. When the enable input En of image side buffer 228 is low, image side buffer 228 electrically isolates image side port 96 from internal bus 286.

Internal bus 286 is connected to host side port 108 by host side buffer 226. Host side port 108 is formed by the host side buffer pins $\overline{MWR}$, $\overline{MRD}$, D0-D15, and A0-A19. These pins are connected to the respective lines 248, 246, 250 and 244 of host side bus 104. The enable input En of host side buffer 226 is connected to output EnH of arbitration circuit 300. When the enable input En of host side buffer 226 is high, host side buffer 226 connects host side port 108 to the respective lines of internal bus 286. When the enable input En of host side buffer 226 is low, host side buffer 226 electrically isolates host side port 108 from internal bus 286.

When compressor/expander 36 accesses dual-ported memory 94 through image side port 96, that is when compressor/expander 36 writes or reads dual-ported memory 94 through image side port 96 or signals a refresh on output A23D7, the enable input En of image side buffer 228 is high and the enable input En of host side buffer 226 is low. Internal bus 286 is connected to image side port 96 and disconnected from host side port 108. Internal bus 286 carries signals $\overline{MWR}$, $\overline{MRD}$, D0-D15, A0-A19, and Refresh from image side bus 88. Memory controller 284 provides an interface between internal bus 286 and memory 224 much like memory controller 280 (FIG. 8B) provides an interface between image side bus lines 262, 264, 268, 270, 272 and image memory 90.

When a host (CPU 44 or another processor) accesses dual-ported memory 94 through host side port 108, the enable input En of host side buffer 226 is high and the enable input En of image side buffer 228 is low. Internal bus 286 is connected to host side port 108 and disconnected from image side port 96. Internal bus 286 carries signals from host side bus 104. Memory controller 284 again provides an interface between internal bus 286 and memory 224 much like memory controller 280 provides an interface between image side bus lines 262, 264, 268, 270, 272 and image memory 90.

Arbitration circuit 300 arbitrates between accesses to dual-ported memory 94 through image side port 96 and host side port 108. Arbitration circuit 300 receives signals from image side bus 88 and determines whether access from image side port 96 is requested, that is whether compressor/expander 36 wishes to access or is accessing dual-ported memory 94. Arbitration circuit 300 inputs $\overline{MWRI}$, $\overline{MRDI}$, AI0-AI22, and Refresh are connected, respectively, to image side memory write line 268, memory read line 270, address bus 262 and refresh line 272. When the address inputs AI0-AI22 carry an address in dual-ported memory 94 and at least one of the inputs $\overline{MWRI}$, $\overline{MRDI}$ is asserted, arbitration circuit 300 determines that an access through image side port 96 is requested. Alternatively, when the Refresh input of arbitration circuit 300 is high, arbitration circuit 300 determines that an access through image side port 96 is requested.

Similarly, arbitration circuit 300 has inputs $\overline{MWRH}$, $\overline{MRDH}$, and AH0-AH19 connected, respectively, to host side memory write line 248, memory read line 246 and address bus 244. When the address inputs AH0-AH19 carry an address in dual-ported memory 94 and at least one of the inputs $\overline{MWRH}$, $\overline{MRDH}$ is asserted, arbitration circuit 300 determines that an access through host side port 108 is requested.

When an access through image side port 96 is requested and the host is not accessing dual-ported memory 94 (host side port 108 is disconnected from internal bus 286), arbitration circuit 300 enables image side port 96 by outputting a high signal on the image side enable output EnI. The high signal is received at the enable input En of image side buffer 228, and image side port 96 is connected to internal bus 286.

When an access through image side port 96 is requested while dual-ported memory 94 is being accessed through host side port 108, arbitration circuit 300 signals compressor/expander 36 to wait by outputting appropriate signals on output ReadyI ("asserting" output ReadyI). Output ReadyI of arbitration circuit 300 is connected through image side Ready line 310 of image side bus 88 to the Ready input of compressor/expander 36 (FIG. 8A). In response, compressor/expander 36 extends its current memory cycle. When arbitration circuit 300 determines from its inputs $\overline{MWRH}$, $\overline{MRDH}$, AH0-AH19 that the host is no longer accessing dual-ported memory 94, arbitration circuit 300 disables host side port 108 by outputting a low signal on the host side enable output EnH, and arbitration circuit 300 enables image side port 96 by outputting a high signal on the image side enable output EnI. Arbitration circuit 300 generates appropriate signals on its output ReadyI ("deasserts" output ReadyI) to signal compressor/expander 36 to stop waiting and complete the current memory cycle.

When an access through host side port 108 is requested and an access through image side port 96 is unsought (that is, not requested), arbitration circuit 300 disables image side port 96 by outputting a low signal on the image side enable output EnI and enables host side port 108 by outputting a high signal on the host side enable output EnH. When an access through host side port 108 is requested but is not taking place (host side port 108 is disabled) and an access through image side port 96 is also requested, arbitration circuit 300 enables image side port 96. Arbitration circuit 300 thus gives priority to image side port 96 over host side port 108. Arbitration circuit 300 signals CPU 44 to wait by outputting appropriate signals on output ReadyH ("asserting" output ReadyH) which is connected through host side Ready line 312 of host side bus 104 to the Ready input of CPU 44 (FIG. 8A). In response, CPU 44 extends its current memory cycle. When arbitration circuit 300 determines that an access through image side port 96 is unsought, arbitration circuit 300 disables image side port 96 by outputting a low signal on the image side enable output EnI and enables host side port 108 by outputting a high signal on the host side enable output EnH. Arbitration circuit 300 generates appropriate signals on its output ReadyH ("deasserts" output ReadyH) to signal CPU 44 to stop waiting and complete the current memory cycle.

Figure 9:
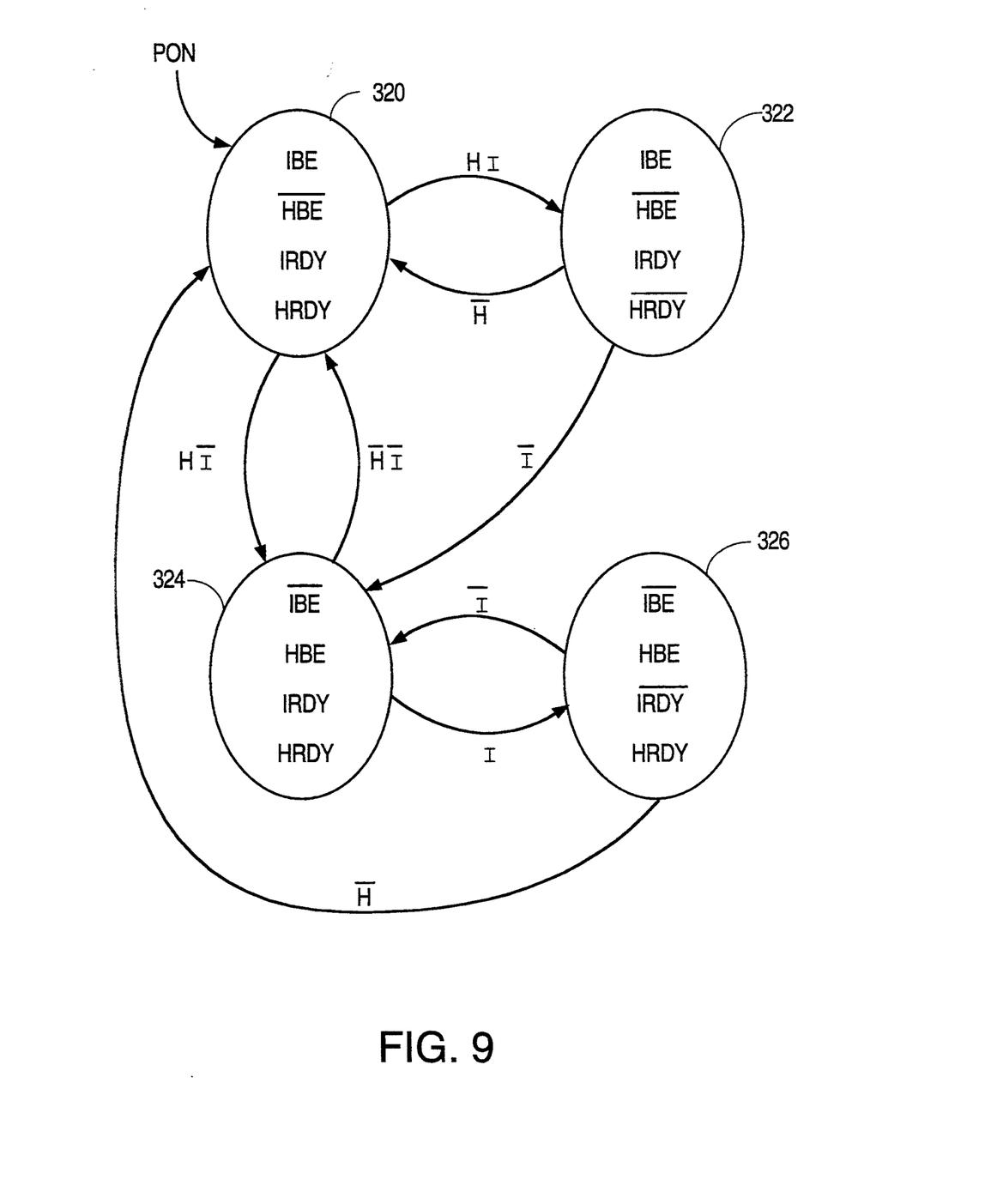
FIG. 9 is a state transition diagram of a state machine implemented by the image compression system of FIGS. 8A–8C.

Arbitration circuit 300 implements a 4-state state machine. The state machine state diagram is shown in FIG. 9. When the power is turned on (arrow PON in FIG. 9), arbitration circuit 300 enters state 320. In state 320, arbitration circuit 300 enables image side port 96 (as is denoted by IBE), disables host side port 108 (as is denoted by $\overline{\text{HBE}}$), and deasserts outputs ReadyI and ReadyH signaling both compressor/expander 36 and CPU 44 not to wait (as is denoted IRDY and HRDY respectively). Image side port 96 is enabled in state 320 even if an access through image side port 96 is not requested. Arbitration circuit 300 continues in state 320 until an access from both image side port 96 and host side port 108 is requested at the same time. When that happens (arrow marked HI), arbitration circuit 300 goes to state 322. In state 322, arbitration circuit 300 enables image side port 96 (IBE), disables host side port 108 ($\overline{\text{HBE}}$), and deasserts its output ReadyI (IRDY), all as in state 320. However, arbitration circuit 300 asserts its output ReadyH ($\overline{\text{HRDY}}$) signaling CPU 44 to wait. When arbitration circuit 300 determines in state 322 that an access through host side port 108 is unsought (arrow marked $\overline{\text{H}}$ from state 322), arbitration circuit 300 returns to state 320 deasserting its output ReadyH.

When arbitration circuit 300 determines in state 320 that an access through host side port 108 is requested and an access through image side port 96 is unsought (arrow $\text{H}\overline{\text{I}}$ from state 320), arbitration circuit 300 goes to state 324. In state 324, arbitration circuit 300 disables image side port 96 ($\overline{\text{IBE}}$), enables host side port 108 (HBE), and deasserts its outputs ReadyI and ReadyH (IRDY, HRDY) signaling CPU 44 and compressor/expander 36 not to wait. When arbitration circuit 300 determines in state 324 that an access through image side port 96 is requested (arrow I from state 324), arbitration circuit 300 goes to state 326. In state 326, arbitration circuit 300 disables image side port 96 ($\overline{\text{IBE}}$) and enables host side port 108 (HBE) just like in state 324. Arbitration circuit 300 further asserts its output ReadyI ($\overline{\text{IRDY}}$) signaling compressor/expander 36 to wait. Arbitration circuit deasserts its output ReadyH (HRDY) just like in state 324, signaling CPU 44 not to wait.

When arbitration circuit 300 determines in state 326 that an access through image side port 96 is unsought (arrow $\overline{\text{I}}$ from state 326), arbitration circuit 300 returns to state 324.

When arbitration circuit 300 determines in state 324 that neither an access through image side port 96 nor an access through host side port 108 is requested (arrow $\overline{\text{HI}}$ from state 324), arbitration circuit 300 returns to state 320.

As explained above, when arbitration circuit 300 is in state 320 and both an access through image side port 96 and an access through host side port 108 is requested, arbitration circuit 300 goes to state 322. Arbitration circuit 300 enables image side port 96, disables host side port 108, and signals CPU 44 to wait. When arbitration circuit 300 determines in state 322 that an access through image side port 96 is unsought (arrow $\overline{\text{I}}$ from state 322 to state 324), arbitration circuit 300 goes to state 324. Image side port 96 is disabled, host side port 108 is enabled, and CPU 44 and compressor/expander 36 are signaled not to wait.

As explained above, when arbitration circuit 300 is in state 326, image side port 96 is disabled, host side port 108 is enabled, and compressor/expander 36 is signaled to wait. When arbitration circuit 300 determines in state 326 that an access through host side port 108 is unsought (arrow $\overline{\text{H}}$ from state 326), arbitration circuit 300 returns to state 320.

Arbitration circuit 300 is implemented by a programmable logic device using conventional design and implementation methods.

While the invention has been described with respect to the embodiments set forth above, other embodiments and variations not described herein are within the scope of the invention. For example, the invention extends to systems which perform compression but not expansion of data, and to systems which perform expansion but not compression. In some such systems, compressor/expander 36 is replaced by a compressor that performs only compression or by an expander that performs only expansion. Further, image memory 90 and dual-ported memory 94 do not have to be random access memories. A disk, a tape, and other like storage devices are suitable. Referring to FIGS. 3 and 4, a wide range of storage devices can be used instead of disk 38. In particular, main memory 40 is used in some embodiments. A tape is used in others. Further, compressed data can be transferred between host side port 108 and modem 46 directly rather than through disk 38. Image side bus 88 and host side bus 104 can take many forms. They can comprise wires directly connected to inputs and outputs of devices accessible therefrom. They can also comprise complex logic circuitry. In a variation of the image compression system of FIGS. 8A–8C, other devices besides arbitration circuit 300 access the Ready inputs of CPU 44 or compressor/expander 36 (or both). In some variations, conventional logic accommodates all the Ready line users. Image memory 90 of FIG. 8B and dual-ported memory 94 of FIG. 8C are implemented using memory devices other than type $\mu$PD421000. Other embodiments and variations not described herein are to be considered within the scope of the invention, as defined by the following claims.

What is claimed is:

1. A method of recompressing image data comprising the steps of:
   allocating a first buffer, a second buffer, a third buffer, and a fourth buffer in a storage device;
   writing first data compressed according to a first compression algorithm to said first buffer;

writing the first compressed data to said second buffer;

reading the first compressed data from said second buffer;

converting the first compressed data to second compressed data compressed according to a second compression algorithm;

writing the second compressed data to said third buffer;

writing the second compressed data to said fourth buffer; and reading said second compressed data from said fourth buffer;

wherein said steps of writing to said first buffer, reading from said second buffer, writing to said third buffer and reading from said fourth buffer proceed substantially in parallel.

* * * * *